(12) United States Patent
McClure et al.

(10) Patent No.: US 6,880,875 B2
(45) Date of Patent: Apr. 19, 2005

(54) CARGO PROTECTING SYSTEM FOR A PICKUP TRUCK

(75) Inventors: Kerry Stephen McClure, Dublin, OH (US); Robb Louis Augustine, Dublin, OH (US); David Michael Edwards, Marysville, OH (US); John Eric Werling, Dublin, OH (US); Gerald Allen Flint, Powell, OH (US); Emily C. Nutwell, Dublin, OH (US); Dennis Byungip Chung, Dublin, OH (US)

(73) Assignee: Honda Motor Company, Ltd., Tokyo (JP)

( * ) Notice: Subject to any disclaimer, the term of this patent is extended or adjusted under 35 U.S.C. 154(b) by 0 days.

(21) Appl. No.: 10/663,272

(22) Filed: Sep. 16, 2003

(65) Prior Publication Data

US 2005/0057061 A1    Mar. 17, 2005

(51) Int. Cl.[7] .................................................. B60R 7/04
(52) U.S. Cl. .................................. 296/37.14; 224/42.2
(58) Field of Search ........... 296/37.6, 37.14; 224/42.2, 224/42.12

(56) References Cited

U.S. PATENT DOCUMENTS

| | | | |
|---|---|---|---|
| 2,140,615 A | | 12/1938 | Biszantz |
| 2,547,083 A | | 4/1951 | Lundgren |
| 3,287,058 A | * | 11/1966 | Wells ...................... 296/37.14 |
| 3,559,829 A | | 2/1971 | Shamel |
| 3,764,048 A | | 10/1973 | Gore |
| 3,880,335 A | * | 4/1975 | Winkler ..................... 224/42.2 |
| 3,940,041 A | | 2/1976 | Bott |
| 3,960,048 A | | 6/1976 | Wagner |
| 4,337,976 A | | 7/1982 | Lapine et al. |
| 4,351,555 A | | 9/1982 | Hashimoto |
| 4,418,852 A | | 12/1983 | Grinwald |
| 4,423,900 A | | 1/1984 | Sugimoto et al. |
| 4,533,169 A | | 8/1985 | Rauthmann et al. |

(Continued)

OTHER PUBLICATIONS

Kerry Stephen McClure et al., Copending U.S. Appl. No. 10/663,271, filed Sep. 16, 2003.

Primary Examiner—Lori L. Coletta
(74) Attorney, Agent, or Firm—Dinsmore & Shohl LLP

(57) ABSTRACT

A cargo protecting system for a pickup truck includes a metal support structure that is in a fixed position relative to a pickup truck. A bed floor is fixedly supported by the metal support structure, and the bed floor includes a first support surface for directly supporting cargo, wherein the first support surface is substantially coplanar with a plane. A first chamber is disposed substantially beneath the plane and can be defined by a first shell having first and second openings. The first chamber is accessible from above the plane through the first opening, and the first and second openings can be of sufficient size and dimension to allow the passage of a spare tire. Exemplary embodiments can include a second chamber disposed substantially directly beneath the bed floor and adjacent to the second opening, wherein the second chamber is separate from the first chamber and accessible from the first chamber through the second opening. The second chamber can be configured to provide a storage location directly beneath the bed floor for substantially an entire spare tire. In certain exemplary embodiments, a closure member might be provided along with a securement mechanism and an opening mechanism.

37 Claims, 7 Drawing Sheets

U.S. PATENT DOCUMENTS

| | | |
|---|---|---|
| 4,548,540 A | 10/1985 | Renfro |
| 4,600,233 A | 7/1986 | Boydston |
| 4,695,087 A | 9/1987 | Hollrock |
| 4,733,898 A | 3/1988 | Williams |
| 4,836,600 A | 6/1989 | Miyazaki et al. |
| 4,941,703 A | 7/1990 | Curry |
| 4,944,544 A | 7/1990 | Dick |
| 4,946,215 A | 8/1990 | Taylor |
| 4,998,769 A | 3/1991 | Johnson et al. |
| 5,026,107 A | 6/1991 | Hess |
| 5,056,846 A | 10/1991 | Tanaka |
| 5,056,858 A | 10/1991 | Tanaka |
| 5,061,002 A | 10/1991 | Saso |
| 5,125,710 A | 6/1992 | Gianelo |
| 5,172,519 A | 12/1992 | Cooper |
| 5,192,108 A | 3/1993 | Richardson et al. |
| 5,251,947 A | 10/1993 | Kirila, II et al. |
| 5,316,358 A | 5/1994 | Payne et al. |
| 5,324,089 A | 6/1994 | Schlachter |
| 5,372,289 A | 12/1994 | Dachicourt |
| 5,382,069 A | 1/1995 | Chambers |
| 5,441,183 A | 8/1995 | Frenzel |
| 5,458,353 A | 10/1995 | Hanemaayer |
| 5,492,257 A | 2/1996 | Demick |
| 5,518,158 A | 5/1996 | Matlack |
| 5,520,316 A | 5/1996 | Chen |
| 5,564,776 A | 10/1996 | Schlachter |
| 5,599,054 A | 2/1997 | Butz et al. |
| 5,615,922 A | 4/1997 | Blanchard |
| 5,626,380 A | 5/1997 | Elson et al. |
| 5,632,520 A | 5/1997 | Butz |
| 5,636,890 A | 6/1997 | Cooper |
| 5,669,534 A | 9/1997 | Edgerley |
| 5,716,091 A | 2/1998 | Wieczorek |
| 5,762,245 A | 6/1998 | Hurst |
| 5,784,769 A | 7/1998 | Clare |
| 5,797,642 A | 8/1998 | Takanishi et al. |
| 5,799,845 A | 9/1998 | Matsushita |
| 5,823,585 A | 10/1998 | Tanguay |
| 5,823,598 A | 10/1998 | Clare et al. |
| 5,826,931 A | 10/1998 | Perlman et al. |
| 5,836,637 A | 11/1998 | Laginess et al. |
| 5,842,730 A | 12/1998 | Schneider et al. |
| 5,860,687 A | 1/1999 | Corporon et al. |
| 5,895,086 A | 4/1999 | Carico |
| 5,915,777 A | 6/1999 | Gignac et al. |
| 5,961,172 A | 10/1999 | Ament et al. |
| 5,964,491 A | 10/1999 | Marsh et al. |
| 5,971,462 A | 10/1999 | Bell et al. |
| 5,979,962 A | 11/1999 | Valentin et al. |
| 5,979,973 A * | 11/1999 | Clare et al. ................ 296/37.6 |
| 6,003,921 A | 12/1999 | Tozuka |
| 6,015,177 A | 1/2000 | Tijerina |
| 6,027,155 A | 2/2000 | Wisniewski et al. |
| 6,030,018 A | 2/2000 | Clare et al. |
| 6,033,002 A | 3/2000 | Clare et al. |
| 6,039,105 A | 3/2000 | Patmore et al. |
| 6,039,378 A | 3/2000 | Bailey |
| 6,050,202 A | 4/2000 | Thompson |
| 6,059,141 A | 5/2000 | Wojnowski |
| 6,059,341 A | 5/2000 | Jensen et al. |
| 6,065,794 A | 5/2000 | Schlachter |
| 6,073,985 A | 6/2000 | Keip |
| 6,082,804 A | 7/2000 | Schlachter |
| 6,089,639 A * | 7/2000 | Wojnowski ................ 296/37.6 |
| 6,092,852 A | 7/2000 | Lawrence |
| 6,102,464 A | 8/2000 | Schneider et al. |
| 6,102,474 A | 8/2000 | Daley |
| 6,113,172 A | 9/2000 | Chaloult et al. |
| 6,126,219 A | 10/2000 | Wilkinson et al. |
| 6,129,401 A | 10/2000 | Neag et al. |
| 6,135,527 A | 10/2000 | Bily |
| 6,155,625 A | 12/2000 | Felix |
| 6,170,724 B1 | 1/2001 | Carter et al. |
| 6,199,930 B1 | 3/2001 | Riley |
| 6,224,138 B1 | 5/2001 | Adsit et al. |
| 6,231,100 B1 | 5/2001 | Fournier |
| 6,234,559 B1 | 5/2001 | Block et al. |
| 6,237,211 B1 | 5/2001 | Clare et al. |
| 6,241,137 B1 | 6/2001 | Corr |
| 6,247,741 B1 | 6/2001 | Seel et al. |
| 6,254,162 B1 | 7/2001 | Faber et al. |
| 6,267,427 B1 | 7/2001 | Ziehl |
| 6,283,526 B1 | 9/2001 | Keough et al. |
| 6,290,278 B1 | 9/2001 | Loveland |
| 6,296,289 B1 | 10/2001 | Gehring et al. |
| 6,302,465 B1 | 10/2001 | Faber et al. |
| 6,328,366 B1 | 12/2001 | Foster et al. |
| 6,336,671 B1 | 1/2002 | Leonardi |
| 6,389,670 B1 | 5/2002 | Morin et al. |
| 6,422,567 B1 | 7/2002 | Mastrangelo et al. |
| 6,439,633 B1 | 8/2002 | Nemoto |
| 6,481,773 B1 * | 11/2002 | Salani et al. ............. 296/37.14 |
| 6,502,886 B1 * | 1/2003 | Bleau et al. ............. 296/37.14 |
| 6,719,348 B1 * | 4/2004 | Song ....................... 296/37.14 |
| 2001/0013709 A1 | 8/2001 | Clare et al. |
| 2001/0041126 A1 | 11/2001 | Morin et al. |
| 2001/0051089 A1 | 12/2001 | Morin et al. |
| 2001/0052714 A1 | 12/2001 | Clare |
| 2002/0070574 A1 * | 6/2002 | Carlsson et al. ......... 296/37.14 |
| 2003/0057724 A1 * | 3/2003 | Inagaki et al. .......... 296/37.14 |
| 2003/0090120 A1 * | 5/2003 | Barber et al. ........... 296/37.14 |

* cited by examiner

US 6,880,875 B2

CARGO PROTECTING SYSTEM FOR A PICKUP TRUCK

TECHNICAL FIELD

The present invention relates to a cargo protecting system for integration into the bed of a pickup truck. The cargo protecting system can provide a protected storage location below the floor of the pickup truck bed for one or more cargo items, such as a spare tire.

BACKGROUND OF THE INVENTION

Pickup trucks are commonly used to facilitate transportation of cargo items from one location to another. While pickup trucks are available in many sizes and configurations, a typical pickup truck includes a truck bed having a cargo carrying floor that can support cargo, such as lumber, rocks, groceries and/or other items. Because a conventional truck bed is open to the atmosphere, such a truck bed, without protection, is unsuitable to support cargo that is sensitive to theft and/or damage by environmental elements.

For these reasons, certain protective devices such as truck caps, tonneau covers, and toolboxes are in widespread use to protect cargo within a truck bed from weather, dirt and other environmental elements. However, such protective devices tend to reduce the storage and transport capacity of the truck bed. For example, a truck cap or a bed lid, both of which are typically fitted to the sides of a truck bed above the bed floor, significantly limit the use of a truck bed to haul or store tall or wide cargo (that would otherwise fit into a truck bed not fitted with a truck cap or bed lid). Other common protective devices include tonneau covers and toolboxes, but these devices can only protect a limited amount of cargo, and in doing so substantially reduce the truck bed's storage capacity for unprotected cargo. In short, presently available equipment for protecting cargo in truck beds, such as truck caps, bed lids, tonneau covers and toolboxes, significantly limit the flexibility and cargo carrying capacity of a truck bed.

However, without such protective devices, a conventional pickup truck provides few storage options for cargo that requires protection from theft and/or environmental elements. Consequently, pickup truck users typically must choose between flexibility/capacity and protecting their cargo. Accordingly, there is a need for a pickup truck having a truck bed that is configured to protect certain cargo from theft and from environmental conditions, but that provides the full capacity and flexibility for hauling unprotected cargo as would be provided by a similarly-sized conventional pickup truck having an unprotected truck bed. More particularly, there is a need for a secure and lockable storage location on a pickup truck that substantially protects a spare tire and/or other cargo from theft, moisture and debris, and that facilitates simple and clean access to the spare tire and/or other cargo by an operator of the pickup truck.

SUMMARY OF THE INVENTION

Accordingly, it is an aspect of the present invention to provide a cargo protecting system for a pickup truck that protects certain cargo from the environment without substantially diminishing the overall cargo carrying capabilities of the truck bed. Furthermore, it is an aspect of the invention to provide a secure and lockable storage location on a pickup truck that substantially protects a spare tire and/or other cargo from theft, moisture and debris, and that facilitates simple and clean access to the spare tire and/or other cargo by an operator of the pickup truck.

To achieve the foregoing and other aspects, and in accordance with the purposes of the present invention defined herein, a cargo protecting system for a pickup truck is provided. In one embodiment, the system includes a metal support structure that is in a fixed position relative to a pickup truck. A bed floor is fixedly supported by the metal support structure. The bed floor includes a first support surface for directly supporting cargo and that is substantially coplanar with a plane. A first chamber is disposed substantially beneath the plane. The first chamber is defined by a first shell that has first and second openings. The first chamber is accessible from above the plane through the first opening, with the first and second openings being of sufficient size and dimension to allow the passage of a spare tire. A second chamber is disposed substantially directly beneath the bed floor and adjacent to the second opening. The second chamber is separate from the first chamber and is accessible from the first chamber through the second opening. The second chamber can be configured to provide a storage location directly beneath the bed floor for substantially an entire spare tire.

In another exemplary embodiment of the present invention, a cargo protecting system for a pickup truck is provided. The system includes a metal support structure that is in a fixed position relative to a pickup truck. A bed floor is fixedly supported by the metal support structure. The bed floor includes a first support surface for directly supporting cargo. The first support surface is substantially coplanar with a plane. A first chamber is disposed substantially beneath the plane, is defined by a first shell having a first opening, and is accessible from above the plane through the first opening. A closure member is hingedly associated with the bed floor and includes a second support surface for directly supporting cargo. The closure member is moveable between a first position in which the second support surface aligns substantially coplanarly with the first support surface and at least partially covers the first opening, and a second position in which the closure member is at least partially removed from the first opening to provide access to the first chamber through the first opening. A securement mechanism moveable between locked and unlocked positions is provided for selectively locking the closure member in the first position. An opening mechanism is also provided for moving the securement mechanism between the locked and unlocked positions. The securement mechanism and the opening mechanism are both disposed entirely below the second support surface when the closure member is in the first position.

In yet another exemplary embodiment of the present invention, a cargo protecting system for a pickup truck is provided. The system includes a metal support structure that is integral with a unibody of a pickup truck. A bed floor is fixedly supported by the metal support structure. The bed floor includes a first support surface for directly supporting cargo. The first support surface is substantially coplanar with a plane. A first chamber is disposed substantially beneath the plane and is defined by a first shell having first and second openings. The first chamber is accessible from above the plane through the first opening, and the first and second openings are of sufficient size and dimension to allow the passage of a spare tire. A second chamber is disposed substantially directly beneath the bed floor and adjacent to the second opening. The second chamber is separate from the first chamber and is accessible from the first chamber through the second opening. The second chamber can be configured to provide a storage location directly beneath the bed floor for substantially an entire spare tire. A closure member is hingedly associated with the bed floor and includes a second support surface for directly supporting cargo. The closure member is moveable between a first position in which the second support surface aligns substantially coplanarly with the first support surface and at least partially covers the first opening, and a second position in which the closure member is at least partially removed from the first opening to provide access to the first chamber through the first opening. A securement mechanism moveable between locked and unlocked positions is provided for selectively locking the closure member in the first position. An opening mechanism is also provided for moving the securement mechanism between the locked and unlocked positions. The securement mechanism and the opening mechanism are both disposed entirely below the second support surface when the closure member is in the first position.

The cargo protecting systems described herein are advantageous for protecting certain cargo from the environment without substantially diminishing a truck bed's overall cargo carrying capacity and flexibility. As an additional advantage, an exemplary cargo protecting system can provide a secure and lockable storage location on a pickup truck that substantially protects a spare tire and/or other cargo from theft, moisture and debris, and that facilitates simple and clean access to the spare tire and/or other cargo by an operator of the pickup truck. Additional aspects, advantages, and novel features of the invention will be set forth in part in the description that follows, and in part will become apparent to those skilled in the art upon examination of the following or may be learned with the practice of the invention. The aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
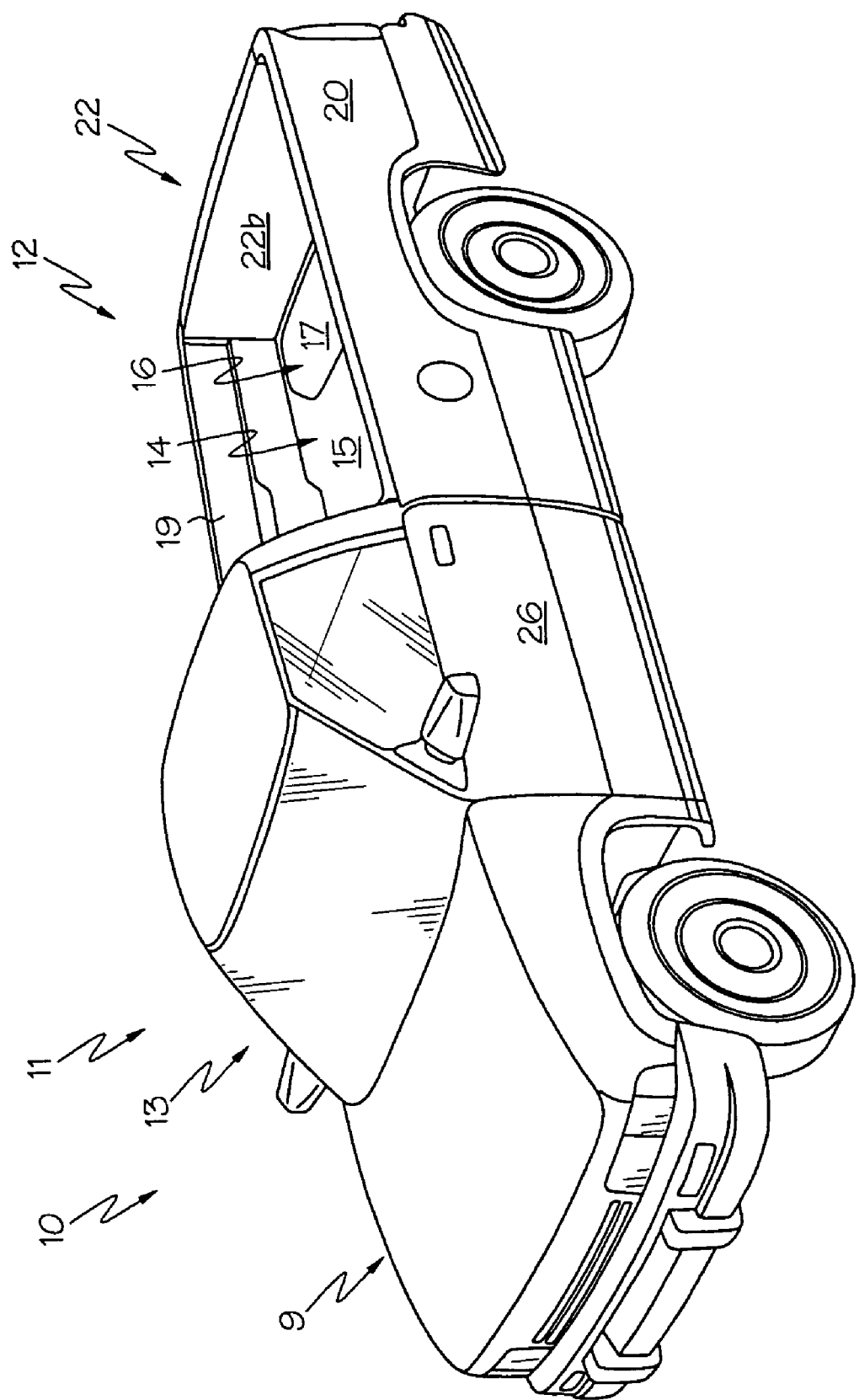
FIG. 1 is a front perspective view of a pickup truck having a truck bed with a cargo protecting system in accordance with one exemplary embodiment of the present invention.

An exemplary embodiment of the invention and its operation is hereinafter described in detail in connection with the views and examples of FIGS. 1–7, wherein like numbers indicate the same or corresponding elements throughout the views. As shown in FIG. 1, a pickup truck 10 can include a cab portion 11 having a passenger compartment 13 and an engine compartment 9. The pickup truck 10 can also include a truck bed portion 12 that is configured to hold cargo. Although the passenger compartment 13 is depicted as having only two passenger doors (e.g., 26), it is to be understood that a truck bed constructed in accordance with the present invention is suitable for use with virtually any type of pickup truck cab, including for example, an extended cab and a crew cab (e.g., with four passenger doors). Furthermore, although the truck bed portion 12 is shown in FIG. 1 to include vertically-rising walls (e.g., the headboard, side walls, and tailgate, to be later discussed) along each side of the truck bed's cargo carrying floor, it should be understood that a truck bed constructed in accordance with the present invention might have a substantially flat cargo carrying floor that is unbounded by side walls and/or a tailgate, such as would be typical of a flat-bed type truck.

In the illustration of FIG. 1, the truck bed portion 12 includes a tailgate 22 for restraining cargo within the truck bed portion 12 during movement of the pickup truck 10. However, the truck bed portion 12 might alternatively include a net or cage in lieu of the tailgate 22, or perhaps might not include any such rear cargo restraint whatsoever.

Figure 2:
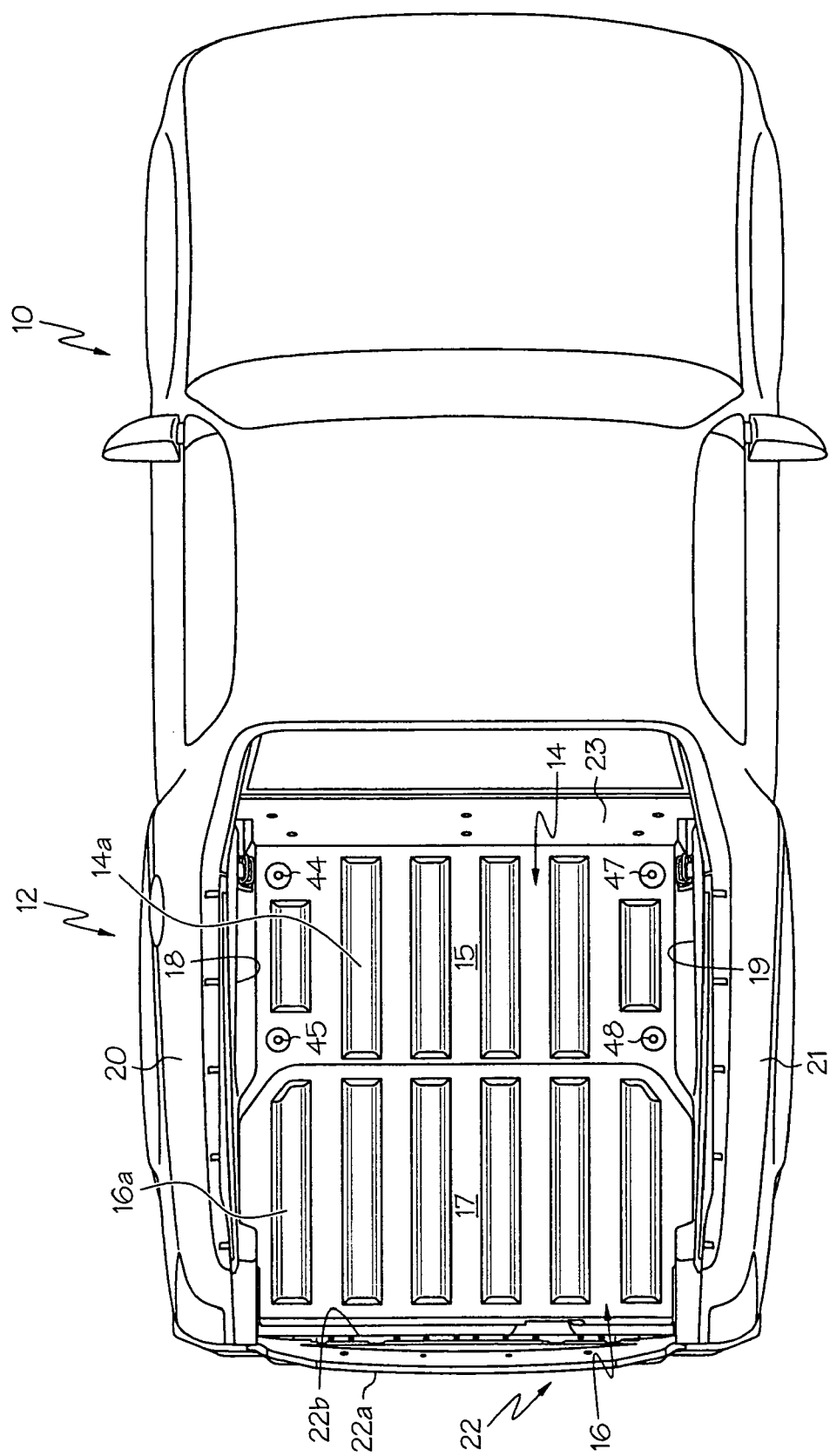
FIG. 2 is a top plan view generally depicting the pickup truck of FIG. 1.

As more clearly shown in FIG. 2, the specifically illustrated truck bed portion 12 is shown to generally include a plurality of outer body components, including a left outer body panel 20, a right outer body panel 21, and portion (e.g., 22a) of tailgate 22. Such outer body components 20, 21, 22a can be formed from any of a variety of materials such as steel, aluminum, plastic, fiberglass, composites, and/or a combination thereof. In one exemplary embodiment, one or more outer body components comprise painted steel sheets. In yet a further embodiment, at least one of the outer body components is formed from plastic.

The truck bed portion 12 can further include one or more inner bed components that substantially define the primary cargo carrying compartment of the pickup truck bed. Such inner bed components can include, for example, a bed floor 14 and a closure member 16 (e.g., such as a cargo lid). The bed floor 14 can include a first support surface 15, and the closure member 16 can include a second support surface 17. The first support surface 15 can be substantially coplanar with a plane (e.g., plane "P" depicted in FIG. 4) and can be substantially coplanar with the second support surface 17 along that same plane when the closure member 16 is closed. In the specifically illustrated embodiment depicted by FIG. 2, for example, the first support surface 15 and the second support surface 17 can substantially provide the cargo carrying floor of the truck bed portion 12, and can accordingly directly support cargo.

Figure 4:
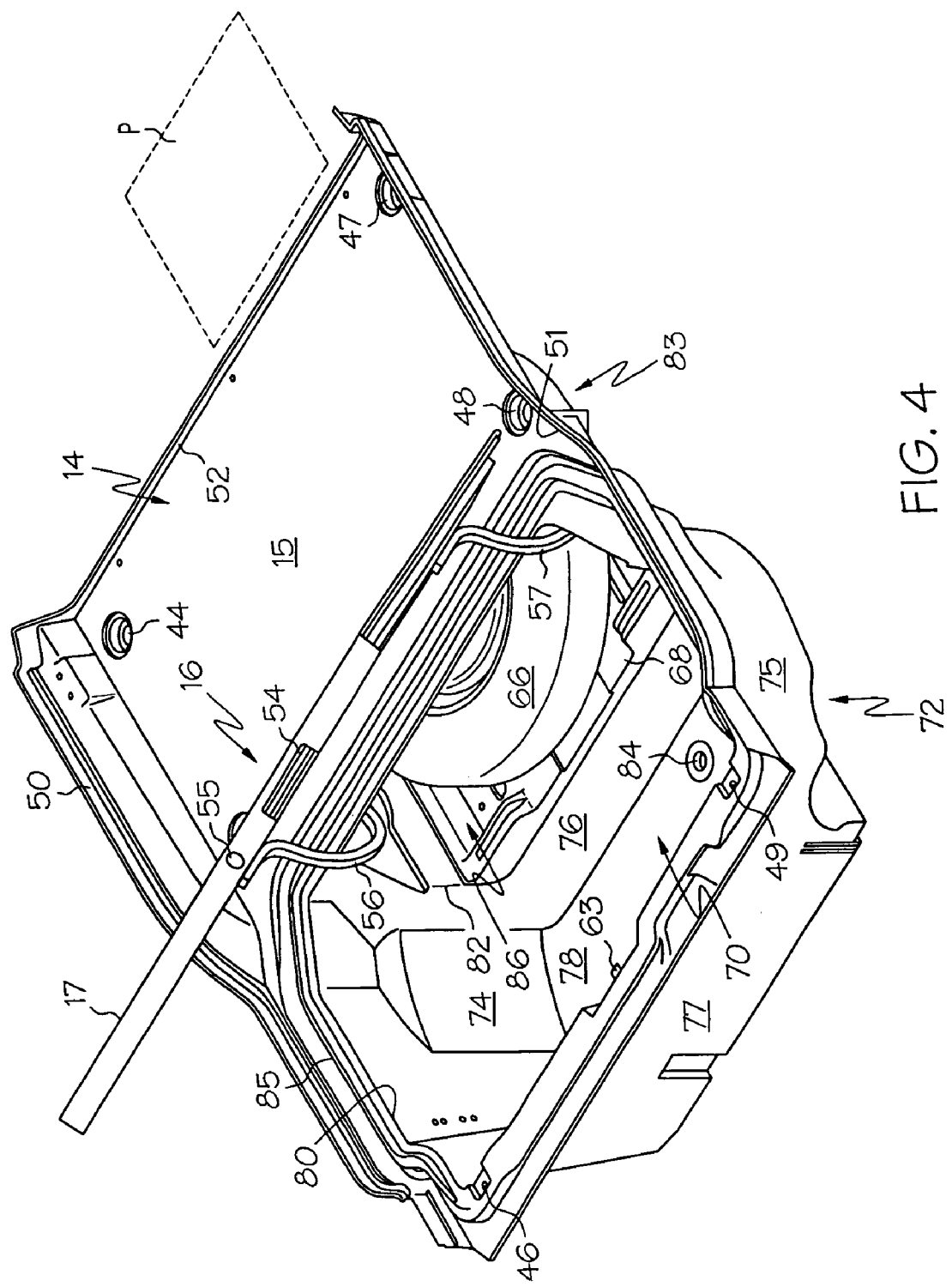
FIG. 4 is a top rear perspective view depicting selected components of the truck bed of FIG. 2 with the closure member in the opened position and with certain contours of the bed floor and of the second closure member removed for clarity.
Figure 5:
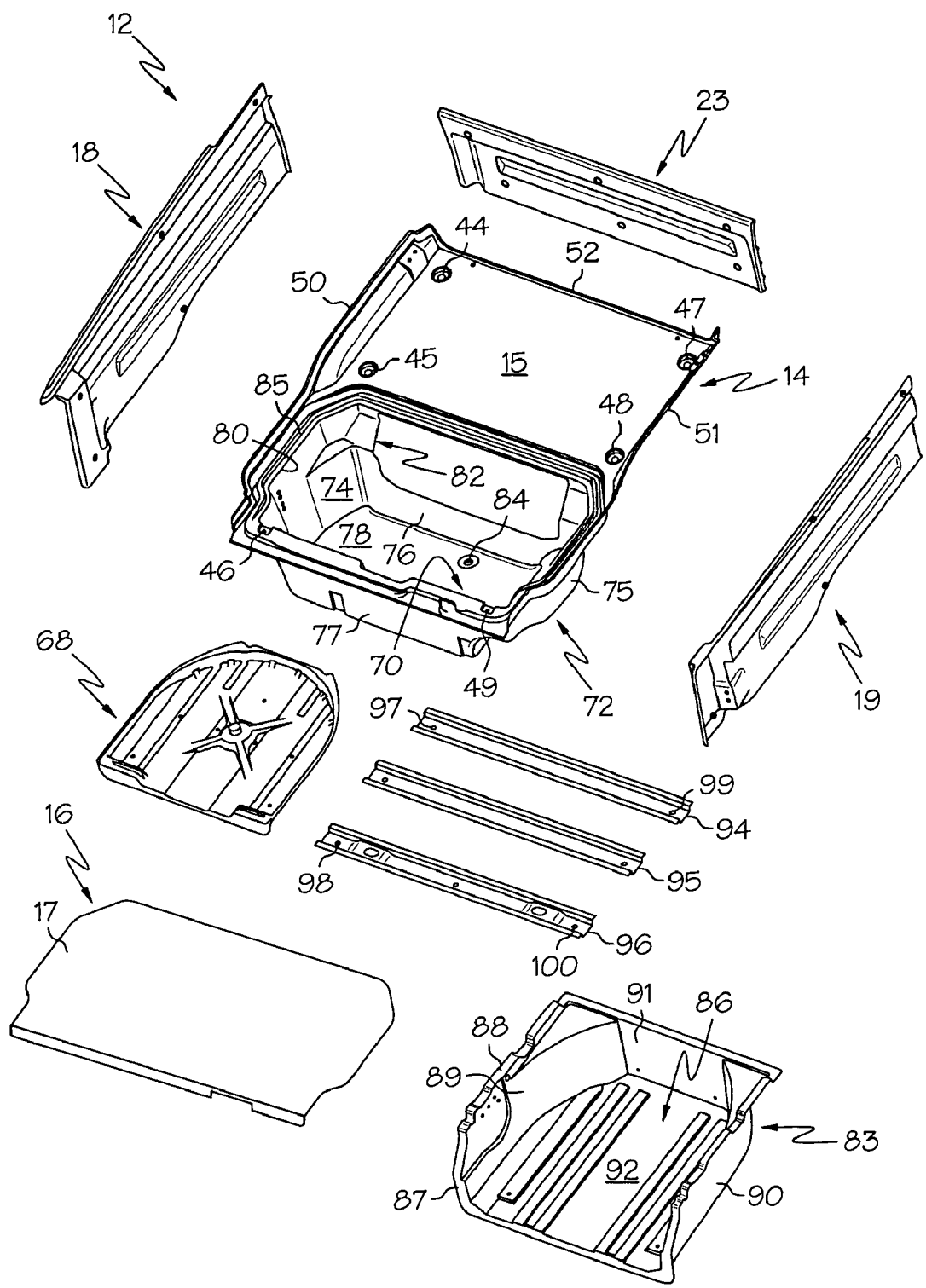
FIG. 5 is an exploded perspective view of selected components of the truck bed of FIG. 2 with certain contours of the bed floor and of the second closure member removed for clarity.

Both the bed floor 14 and the closure member 16 are shown in FIG. 2 to include raised contours (e.g., 14a and 16a). Although such contours can provide rigidity and/or texture to a cargo carrying floor, it should be understood that an exemplary bed floor and/or closure member might not include any such contours (e.g., as shown in FIGS. 1, 4 and 5). Although FIG. 2 depicts the cargo carrying floor of the truck bed portion 12 as being substantially defined by a single bed floor 14 and a single closure member 16, it is of course to be understood that an exemplary truck bed might have a cargo carrying floor defined by one or more bed floors in conjunction with one or more closure members. If a truck bed includes a plurality of bed floors, each of the bed floors can be oriented substantially coplanarly to define the cargo carrying floor of the truck bed. Adjacent bed floors can be joined directly together with adhesives or fasteners, or might alternatively be indirectly connected through a metal support structure, for example. Furthermore, each closure member of an exemplary truck bed portion can be configured to selectively cover either one or more chambers disposed beneath the plane of the bed floor(s).

The inner bed components can further include a left side member 18, a right side member 19, a headboard member 23, and/or a portion (e.g., 22b) of the tailgate 22. The side members 18, 19 and the headboard member 23 can extend upwardly from a location adjacent to at least a portion of the bed floor. The members 18, 19, 23 and the tailgate portion 22b can assist in restraining cargo within the truck bed portion 12. The inner bed components can be formed from any number of materials, as for example, steel, aluminum, plastic, fiberglass, composites, and/or a combination thereof. In one exemplary embodiment, the inner bed components can include a plurality of plastic panels. For example, each of the bed floor 14, the left side member 18, the right side member 19, the headboard member 23, and the closure member 16 can comprise a separate SMC (Sheet Molded Compound) plastic panel. One or more of these plastic panels might comprise and/or be associated with integral or non-integral metal reinforcement components. For example, braces 94, 95 and 96 can be formed from metal and glued with adhesive to the underside of the bed floor 14, as depicted for example in FIG. 6.

The inner bed components can be supported by an underlying metal support structure. The metal support structure can be in a fixed position relative to a pickup truck, and in some embodiments can be secured to a pickup truck frame or unibody such as with welds, bolts, or other fastening. In another embodiment, the metal support structure might be integral with the pickup truck's frame or unibody. A metal support structure can comprise steel, aluminum, one or more other metals, and/or a combination thereof.

Figure 3:
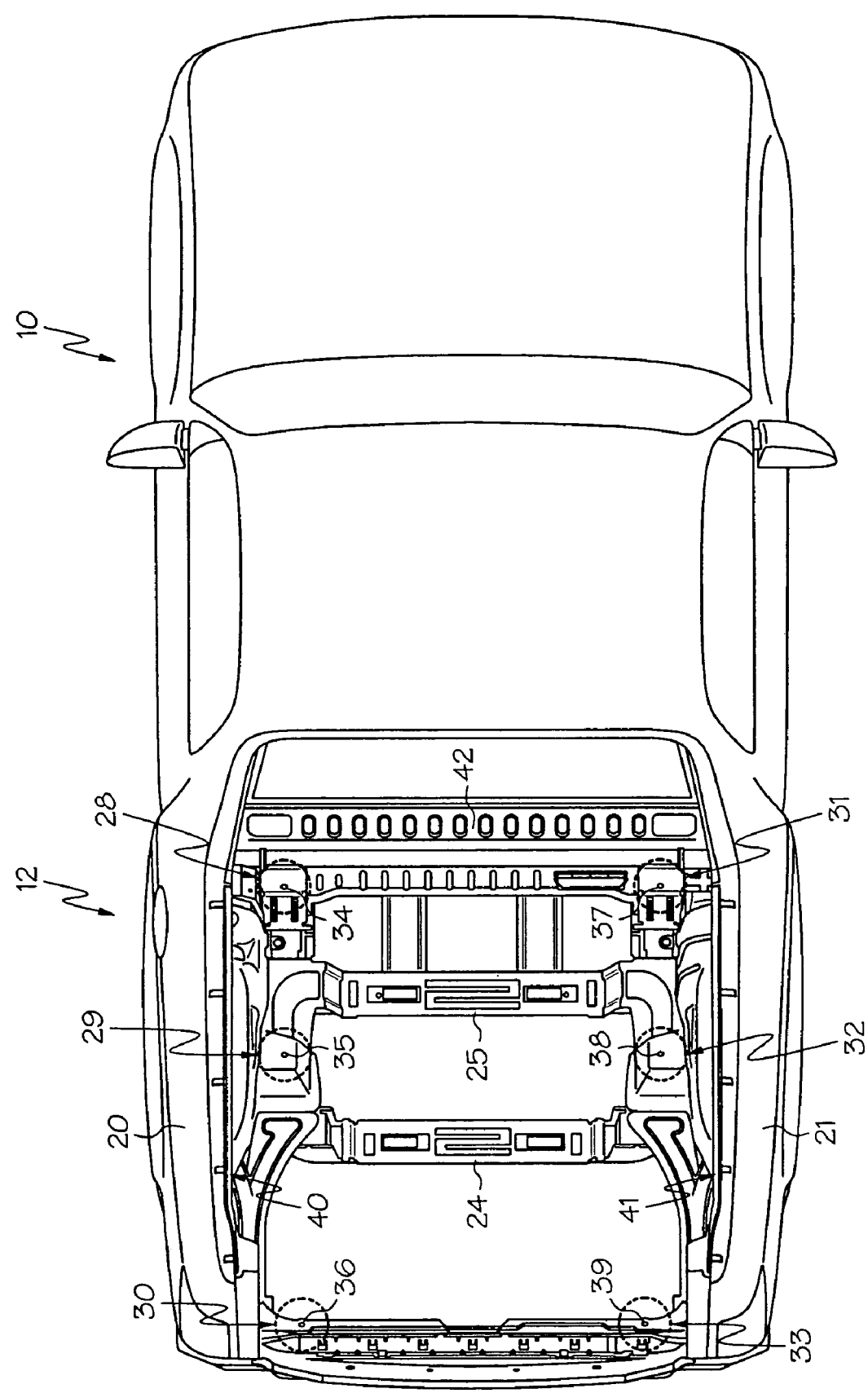
FIG. 3 is a top plan view depicting the pickup truck of FIG. 2 with certain components removed to expose an exemplary underlying metal support structure.

A metal support structure can include one or more support members. A support member provides support and/or a fastening location for at least a portion of one or more of the inner bed components. For example, an exemplary metal support structure is shown in FIG. 3 to integrally comprise a plurality of support members 28, 29, 30, 31, 32 and 33 that are configured to provide subjacent support to the bed floor 14 and the closure member 16. Referencing FIGS. 2–4, the bed floor 14 can be fixedly supported by the metal support structure, for example, by aligning apertures 44, 45, 46, 47, 48 and 49 in the bed floor 14 with apertures 34, 35, 36, 37, 38 and 39 in the respective support members 28, 29, 30, 31, 32 and 33, and then by inserting bolts or other fasteners through these aligned apertures. The metal support structure of FIG. 3 is also shown to include a left support structure 40 (e.g., for providing support for the left outer body panel 20 and/or the left side member 18), a right support structure 41 (e.g., for providing support for the right outer body panel 21 and/or the right side member 19), and a headboard support structure 42 (e.g., for providing support for the headboard member 23). Of course, it should be understood that the specific configuration of the metal support structure will vary depending upon the specific type and configuration of the inner bed components (e.g., the shape of the bed floor 14).

As illustrated in FIG. 4, the closure member 16 can be opened to reveal both a first chamber 70 and a second chamber 86, wherein the second chamber 86 can be separate from the first chamber 70. It should be understood that the first chamber 70 and the second chamber 86 can be disposed substantially or entirely beneath the plane (e.g., plane "P"). The first chamber 70 can be substantially defined by a first shell 72. The first shell 72 can be formed from any number of materials, as for example, metal (e.g., steel or aluminum), plastic, fiberglass, composites, and/or a combination thereof. The first shell 72 can include a left side surface 74, a right side surface 75, a front surface 76, a back surface 77, and a bottom surface 78. The first shell 72 can further include a first opening 80 that is configured to be selectively covered by the closure member 16 (e.g., configured as a cargo lid) when the closure member 16 is closed. The first shell 72 can be accessible from above the plane (e.g., plane P) through the first opening, and may also include a second opening 82. The second chamber 86 can be accessible from the first chamber 70 through this second opening 82, and can be disposed substantially directly beneath the bed floor and adjacent to the second opening 82 in the first shell 72. In one exemplary embodiment of the present invention, the first opening 80 and the second opening 82 are each of sufficient size and dimension to allow the passage of a spare tire therethrough. One or more drain holes (e.g., 84) can be provided in the first shell 72 such as to facilitate the egress of moisture from within the first chamber 70 and/or the second chamber 86 to the outside atmosphere. Similar drain holes might also be associated with the second chamber 86.

The second chamber 86 can be partially defined by the underside of the bed floor 14, and can be further defined by a second shell 83. The second shell 83 can be formed from any number of materials, as for example, metal (e.g., steel or aluminum), plastic, fiberglass, composites, and/or a combination thereof. Although the bed floor 14 can be provided integrally with at least a portion of the first shell 72 (as depicted in FIG. 4), it should be understood that alternate embodiments of the present invention might involve a first shell that is formed either partially or wholly separate from the bed floor. In one exemplary embodiment of the present invention, the bed floor integrally provides at least a portion of the first shell, but the second shell might be formed separately from both the first shell and the bed floor. In another exemplary embodiment, the bed floor integrally provides at least a portion of the second shell, but the first shell might be formed separately from both the second shell and the bed floor. In yet another exemplary embodiment, the first shell, the second shell and at least a portion of the bed floor can all be formed integrally. In still another exemplary embodiment, the first shell, the second shell and the bed floor can all be formed separately.

The second shell 83 can be configured to substantially surround a spare tire (e.g., 66) inserted therein for storage, and can partially or completely underlie the bed floor 14. The second shell 83 can thereby define a second chamber 86 that is configured to provide a storage location directly beneath the bed floor 14 for substantially an entire spare tire (e.g., see FIG. 4). The spare tire 66 can be placed directly upon the bottom surface (e.g., 92 in FIG. 5) of the second shell 83. Alternatively, as depicted in FIG. 4, an optional spare tire tray 68 can be provided to support the spare tire 66 within the second chamber, wherein the tray is configured to slidingly engage the second shell 83 to facilitate easier movement of a spare tire between the second chamber and the first chamber. The spare tire tray 68 can be formed from steel, aluminum, plastic, fiberglass, composites, and/or a combination thereof. In one exemplary embodiment, the spare tire tray 68 is formed from plastic. Regardless of whether the spare tire tray 68 is provided, the spare tire 66 can be inserted into the first chamber 70 through the first opening 80 in the first shell 72, and can then be inserted (e.g., by sliding) into the second chamber 86 from the first chamber 70 through the second opening 82 in the first shell 72. Likewise, the spare tire 66 can be removed (e.g., by sliding) from the second chamber 86 into the first chamber 70 through the second opening 82 in the first shell 72, and then removed from the first chamber 70 via the first opening 80 in the first shell 72.

A spare tire for a pickup truck can include an extra wheel (including an inflated tire mounted upon a rim) that can be used to replace a defective wheel on the pickup truck such as in the event of an unexpected loss of air in the defective wheel. In some circumstances, a spare tire might be equivalent in size to the defective wheel and might accordingly be suitable to permanently replace the defective wheel, but in other circumstances the spare tire might be smaller than the defective wheel and might accordingly only be suitable to temporarily replace the defective wheel.

The closure member 16 can include a support panel (e.g., 111 in FIG. 7) that substantially underlies the second support surface 17 for providing strength and rigidity to the second support surface 17. Although the support panel 111 can be formed from any of a variety of materials, in an exemplary embodiment the support panel 111 comprises metal. The closure member 16 can be associated with the bed floor 14 in any of a variety of specific configurations. For example, the closure member can be provided in hinged association with the bed floor 14. More particularly, hinges 56 and 57 can connect the closure member 16 directly to the bed floor 14, directly to the first shell 72, directly to the second shell 83, and/or to another portion of the truck bed 12. In the embodiment depicted by FIG. 6, the hinges 56 and 57 connect the closure member 16 directly to the second shell 83. A hinge support plate 101 is disposed upon the left side surface 89 of the second shell 83. Bolts or other fasteners can be used to secure the hinge 56 against the portion of the left side surface 89 that is reinforced by the hinge support plate 101. A similar hinge support plate can be provided upon the right side surface (e.g., 90 depicted in FIG. 5) of the second shell 83 to support the hinge 57 with respect thereto. In such a configuration, the hinges 56 and 57 allow the closure member 16 to move or swing between a first position and a second position. In the first position, the closure member 16 is closed such that the second support surface 17 aligns substantially coplanarly with the first support surface 15, and such that the closure member 16 at least partially covers the first opening 80 to the first chamber 70. In the second position, the closure member 16 is opened (e.g., at least partially removed from the first opening 80) to provide access to the first chamber 70 through the first opening 80.

Figure 6:
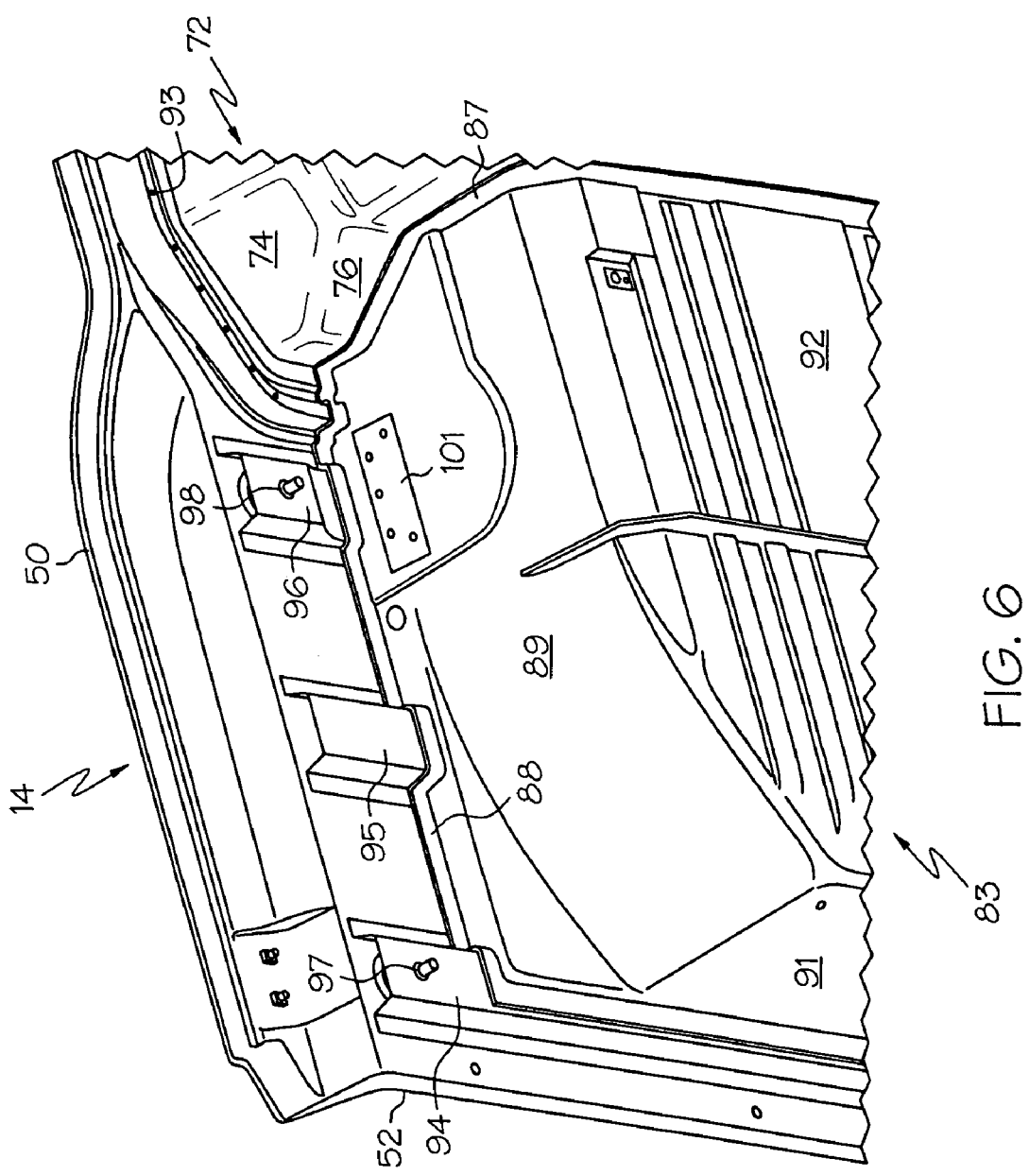
FIG. 6 is a bottom perspective view depicting selected components of the truck bed of FIGS. 2 and 4–5 as assembled.
Figure 7:
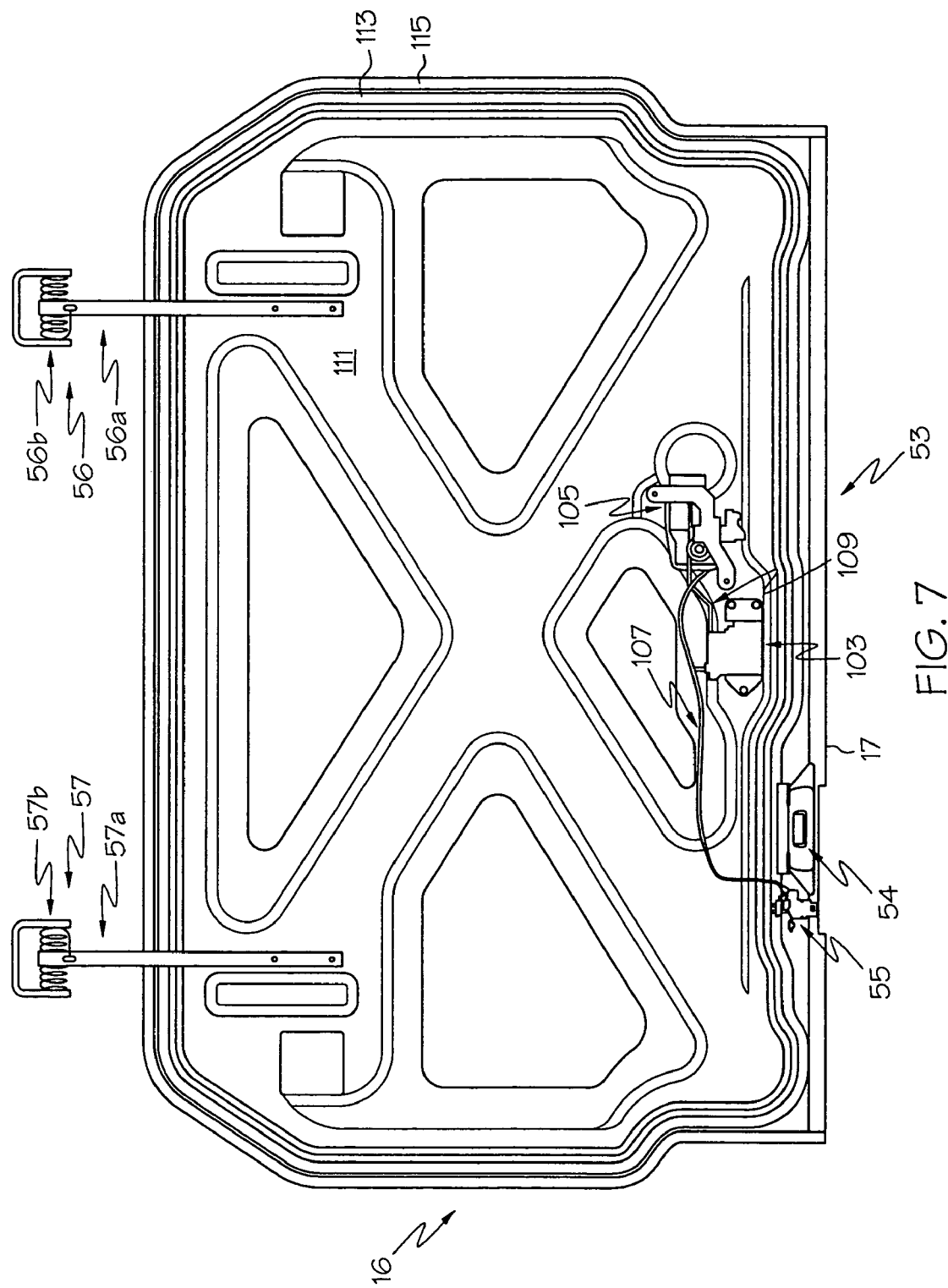
FIG. 7 is a bottom plan view depicting the closure member of FIGS. 2 and 4–5 in conjunction with an exemplary hinge arrangement.

Those skilled in the art will appreciate that the hinges 56 and 57 can be spring-loaded (e.g., as shown in FIG. 7) in order to selectively support the closure member 16 in its opened position until such time as the closure member 16 is pushed downwardly into its closed position (e.g., by an operator). More particularly, the hinges 56 and 57 can provide a toggle function for maintaining the closure member 16 in either an open position or a closed position. The hinge 56 is shown in FIG. 7 to include an arm 56a that connects the support panel 111 to the spring assembly 56b, wherein the spring assembly 56b can be fastened to the portion of the left side surface 89 (shown in FIGS. 5–6) that can be reinforced by the hinge support plate 101, for example. Similarly, the hinge 57 is shown in FIG. 7 to include an arm 57a that connects the support panel 111 to the spring assembly 57b, wherein the spring assembly 57b can be fastened to the portion of the right side surface 90 (shown in FIG. 5) that can be similarly reinforced by a hinge support plate. Of course, it should be understood that other supporting arrangements can additionally or alternatively be provided to selectively maintain the closure member in an opened and/or closed position.

As best shown in FIG. 7, a securement mechanism 53 can be moveable between locked and unlocked positions for selectively locking or retaining the closure member in the first position (e.g., closed). The securement mechanism 53 can include a lock 103 for selectively engaging an aptly positioned catch (e.g., 63 shown in FIG. 4) to thereby retain the closure member 16 in its closed position during engagement of the lock and catch. The closure member 16 can then be opened when the lock 103 disengages the catch 63. Although FIG. 7 depicts the lock 103 as being mounted upon the closure member 16 and FIG. 4 depicts the catch 63 being supported by the first shell 72, it should be understood that a securement mechanism might alternatively include a catch that is mounted upon the closure member 16 and a lock that is attached to the first shell 72. In still further embodiments, multiple lock/catch sets might be provided for a single closure member 16, or one or more other varieties of securement mechanisms might be implemented.

The closure member 16 can further comprise an opening mechanism. An opening mechanism can be coupled to the securement mechanism (e.g., via a linkage 109), and can be configured to move the securement mechanism between locked and unlocked positions. For example, an opening mechanism can include an electromechanical actuator 105 that is configured to cause the selective engagement/disengagement by the lock 103 of the catch 63 in response to an opening signal, and the resultant locking/unlocking of the closure member 16. An opening mechanism might also include one or more devices that are configured to receive electrical and/or mechanical opening signals from an operator. Such devices can include a handle 54 and/or a key cylinder 55 (e.g., as might be connected to the actuator 105 via a cable 107), for example. However, the opening mechanism might alternatively receive an opening signal from a remote location or device, such as from an electronic push-button or switch and/or from a radio frequency signal or infrared signal generated by a remote control device or key-fob device in the possession of an operator.

In the specific embodiment depicted in FIG. 7, the securement mechanism 53 and the opening mechanism (including the actuator 105, the handle 54, and the key cylinder 55) are attached to the closure member 16, but are both disposed entirely below the second support surface 17 when the closure member 16 is in its first position (e.g., closed). Hence, no portion of the securement mechanism 53 or the opening mechanism extends through the second support surface 17 or is accessible from above the second support surface 17. In this manner, the securement mechanism 53 and the opening mechanism can be substantially protected from contact with cargo, rain, dirt, and/or other debris when the closure member 16 is closed, and their durability and reliability can accordingly be maximized. Of course, it should be understood that a securement mechanism and an opening mechanism arrangement can be associated with a closure member in a variety of alternate configurations.

As shown most clearly in FIG. 7, the closure member 16 can include a first sealing element and a second sealing element. The first sealing element can comprise a gasket 113 that attaches to the underside of the closure member 16 around and adjacent to the entire outer perimeter of the closure member 16. The second sealing element might include a gasket 115 that is spaced from the first sealing element and that is attached to the underside of the closure member 16 around and adjacent to at least a portion of the outer perimeter of the closure member 16. In an exemplary embodiment, each of these gaskets 113, 115 are configured to interface one or more channels (e.g., 85 in FIG. 4) formed in the bed floor 14 of the truck bed portion 12 when the closure member 16 is closed. Such channel(s) in the bed floor 14 might be provided with one or more drain holes (e.g., 93 in FIG. 6) to facilitate the escape of any moisture that might have evaded one or more of the sealing elements (e.g., gaskets 113, 115). In an alternate embodiment, fewer or additional sealing elements might be provided in similar or alternative configurations to selectively seal a closure member against a bed floor.

FIG. 5 depicts an exploded view of an exemplary truck bed portion 12. The left side member 18, the right side member 19, and the headboard member 23 of the truck bed portion 12 are shown in FIG. 5 as being separate from the bed floor 14. The left side member 18 can be configured to at least partially overlap a tab 50 along the left side of the bed floor 14. Likewise, the right side member 19 can be configured to at least partially overlap a tab 51 along the right side of the bed floor 14. Furthermore, the headboard member 23 can be configured to at least partially overlap a tab 52 along the front of the bed floor 14. Although these overlapping portions might be attached, such portions can alternatively remain unattached but rather spaced with foam or another such material (e.g., to prevent wearing caused by relative sliding therebetween). It is to be understood, however, that in alternate embodiments of the present invention, one or more inner bed components (e.g., the members 18, 19, and 23) can be integral with the bed floor 14.

FIG. 5 also depicts the second shell 83 as including a left side surface 89, a right side surface 90, a front surface 91, a bottom surface 92, a top lip 88 and a front lip 87. As shown most clearly in FIG. 6, the top lip 88 of the second shell can be configured to matingly interface the underside of the bed floor 14, and might further interface one or more braces (e.g., 94, 95 and 96) that are associated with the bed floor 14. Likewise, the front lip 87 can interface the first shell 72 adjacent to the second opening 82 in the first shell 72. Fasteners and/or adhesives may be provided to facilitate the interface between the top lip 88 and the bed floor 14, and/or to facilitate the interface between the front lip 87 and the first shell 72 (to thereby fasten the first shell 72 to the second shell 83). The bottom surface 92 of the second shell 83 can rest upon the lower support members 24 and 25 (see FIG. 3) of the metal support structure, and can be supported thereby. In one exemplary embodiment, the bottom surface 92 is bolted or otherwise fastened to one or both of the lower support members 24 and 25. However, in an alternate embodiment, the bottom surface 92 is not fastened to the lower support members 24 and 25, but merely rests thereon. In either configuration, the weight of a spare tire within the second chamber 86 rests largely upon the lower support members 24 and 25, instead of straining any connection between the top lip 88 and the bed floor 14. The first shell 72 can also be supported by the metal support structure.

Braces 94, 95 and 96 are depicted in FIGS. 5–6 as spanning across at least part of the width of the pickup truck 10, and are shown as being located in a vertical position below the bed floor 14 but above the second shell 83. The top lip 88 of the second shell 83 is shown to interface with the bed floor 14 and each of the braces 94, 95 and 96. The support brace 94 is shown to include apertures 97 and 99, and the support brace 96 is shown to include apertures 98 and 100. Referring to FIGS. 3, 5 and 6, a bolt or other fastener inserted through the aperture 44 in the bed floor 14 can extend through the aperture 97 of the support brace 94, and then into the aperture 34 of the bed floor support member 28 of the pickup truck's metal support structure. Likewise, a bolt or other fastener inserted through the aperture 45 in the bed floor 14 can extend through the aperture 98 of the support brace 96, and then into the aperture 35 of the bed floor support member 29. Still further, a bolt or other fastener inserted into the aperture 47 can extend through the aperture 99 of the support brace 94 and into the aperture 37 of the bed floor support member 31. Also, a bolt or other fastener inserted through the aperture 48 of the bed floor 14 can extend through the aperture 100 of the support brace 96 and into the aperture 38 of the bed floor support member 32. Still further, a bolt or other fastener inserted through the aperture 46 of the bed floor 14 can extend into the aperture 36 in the bed floor support member 30, and a bolt or other fastener inserted through the aperture 49 can extend into the aperture 39 in bed floor support member 33. In this manner, the bed floor 14 can be secured to and supported by the underlying metal support structure of the truck bed portion 12.

Although FIGS. 4–6 depict the surfaces 89, 90, 91 and 92 of the second shell 83 as being substantially solid (e.g., non-porous and continuous) such as to substantially prevent passage of dirt and moisture into the second chamber 86, the second shell 83 might alternatively be formed as an open-type structure (e.g., with porous or otherwise non-continuous surfaces) that might more readily enable dirt and moisture to access the second chamber 86. If such an open-type structure were provided for the second shell 83, a swinging door or other selective barrier might be provided to facilitate selective access to the second chamber 86 from the first chamber 70, such as to exclude passage of dirt and moisture from the second chamber 86 into the first chamber 70. Furthermore, it should be understood that although the first shell 72 is depicted as having substantially solid surfaces, the first shell 72 could alternatively be formed as an open-type structure.

In operation, a spare tire (e.g., for a pickup truck) can be stored within the second chamber 86 and other tools, batteries, vehicular components, or cargo can be stored within the first chamber 70. Access to the first chamber 70 can be achieved by an operator of the pickup truck 10 when the closure member 16 is opened. Access to the second chamber 86 can then be achieved through the first chamber 70. Hence, an exemplary truck bed in accordance with the present invention can facilitate convenient storage of a spare tire and other cargo beneath the floor of a truck bed, all without significantly reducing the truck bed's capacity to haul unprotected cargo (e.g., as compared to a similarly-sized conventional truck bed).

The foregoing description of exemplary embodiments and examples of the invention has been presented for purposes of illustration and description. It is not intended to be exhaustive or limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. It is hereby intended that the scope of the invention be defined by the claims appended hereto.

What is claimed is:

1. A cargo protecting system for a pickup truck, the system comprising:
   a metal support structure, the metal support structure being in a fixed position relative to a pickup truck;
   a bed floor fixedly supported by the metal support structure, the bed floor including a first support surface for directly supporting cargo, the first support surface being substantially coplanar with a plane;
   a first chamber disposed substantially beneath the plane, the first chamber being defined by a first shell having first and second openings, the first chamber being accessible from above the plane through the first opening, the first and second openings being of sufficient size and dimension to allow the passage of a spare tire; and
   a second chamber disposed substantially directly beneath the bed floor and adjacent to the second opening, the second chamber being separate from the first chamber and accessible from the first chamber through the second opening, the second chamber being configured to provide a storage location directly beneath the bed floor for substantially an entire spare tire.

2. The system of claim 1 wherein the metal support structure is integral with a unibody of a pickup truck.

3. The system of claim 1 wherein the bed floor comprises plastic.

4. The system of claim 3 wherein the bed floor further comprises metal reinforcement components.

5. The system of claim 1 wherein the bed floor integrally provides at least a portion of the first shell.

6. The system of claim 1 wherein the second chamber is at least partially defined by a second shell.

7. The system of claim 6 further comprising a tray configured to support a spare tire within the second chamber, wherein the tray is configured to slidingly engage the second shell to facilitate easier movement of a spare tire between the second chamber and the first chamber.

8. The system of claim 6 wherein the second shell is fastened to the first shell with an adhesive.

9. The system of claim 6 wherein the first and second shells are supported by the metal support structure.

10. The system of claim 1 wherein a closure member is provided in hinged association with the bed floor, the closure member including a second support surface for directly supporting cargo and the closure member being configured to selectively cover at least a portion of the first opening.

11. The system of claim 10 wherein the closure member further comprises an opening mechanism for moving a securement mechanism between locked and unlocked positions, the securement mechanism and the opening mechanism both being disposed entirely below the second support surface when the closure member is closed.

12. The system of claim 11 wherein the opening mechanism comprises a handle.

13. The system of claim 11 wherein the opening mechanism comprises a key cylinder.

14. The system of claim 1 further comprising at least one side member extending upwardly from a location adjacent to at least a portion of the bed floor.

15. The system of claim 14 wherein the side member is separate from the bed floor.

16. The system of claim 14 wherein the side member is integral with the bed floor.

17. The system of claim 14 further comprising a headboard member.

18. A cargo protecting system for a pickup truck, the system comprising:
   a metal support structure, the metal support structure being in a fixed position relative to a pickup truck;
   a bed floor fixedly supported by the metal support structure, the bed floor including a first support surface for directly supporting cargo, the first support surface being substantially coplanar with a plane;
   a first chamber disposed substantially beneath the plane, the first chamber being defined by a first shell having a first opening, the first chamber being accessible from above the plane through the first opening;
   a closure member hingedly associated with the bed floor and including a second support surface for directly supporting cargo, the closure member being moveable between a first position in which the second support surface aligns substantially coplanarly with the first support surface and at least partially covers the first opening, and a second position in which the closure member is at least partially removed from the first opening to provide access to the first chamber through the first opening;
   a securement mechanism moveable between locked and unlocked positions for selectively locking the closure member in the first position; and
   an opening mechanism for moving the securement mechanism between the locked and unlocked positions, the securement mechanism and the opening mechanism both being disposed entirely below the second support surface when the closure member is in the first position.

19. The system of claim 18 wherein the metal support structure is integral with a unibody of a pickup truck.

20. The system of claim 18 wherein the bed floor comprises plastic.

21. The system of claim 20 wherein the bed floor further comprises metal reinforcement components.

22. The system of claim 18 wherein the bed floor integrally provides at least a portion of the first shell.

23. The system of claim 18 wherein the opening mechanism comprises a handle.

24. The system of claim 18 wherein the opening mechanism comprises a key cylinder.

25. The system of claim 18 wherein the first shell further comprises a second opening, the first and second openings being of sufficient size and dimension to allow the passage of a spare tire.

26. The system of claim 25 further comprising a second chamber separate from the first chamber and disposed substantially directly beneath the bed floor and adjacent to the second opening, the second chamber being accessible from the first chamber through the second opening.

27. The system of claim 26 wherein the second chamber is configured to provide a storage location directly beneath the bed floor for substantially an entire spare tire.

28. The system of claim 26 wherein the second chamber is at least partially defined by a second shell.

29. The system of claim 28 further comprising a tray configured to support a spare tire within the second chamber, wherein the tray is configured to slidingly engage the second shell to facilitate easier movement of a spare tire between the second chamber and the first chamber.

30. The system of claim 28 wherein the second shell is fastened to the first shell with an adhesive.

31. The system of claim 28 wherein the first and second shells are supported by the metal support structure.

32. The system of claim 18 wherein the closure member further comprises a first sealing element that attaches to the underside of the closure member around substantially the entire outer perimeter of the closure member, and further comprises a second sealing element that attaches to the underside of the closure member around at least a portion of the outer perimeter of the closure member.

33. The system of claim 18 further comprising at least one side member extending upwardly from a location adjacent to at least a portion of the bed floor.

34. The system of claim 33 wherein the side member is separate from the bed floor.

35. The system of claim 33 wherein the side member is integral with the bed floor.

36. The system of claim 33 further comprising a headboard member.

37. A cargo protecting system for a pickup truck, the system comprising:
- a metal support structure, the metal support structure being integral with a unibody of a pickup truck;
- a bed floor fixedly supported by the metal support structure, the bed floor including a first support surface for directly supporting cargo, the first support surface being substantially coplanar with a plane;
- a first chamber disposed substantially beneath the plane, the first chamber being defined by a first shell having first and second openings, the first chamber being accessible from above the plane through the first opening, the first and second openings being of sufficient size and dimension to allow the passage of a spare tire;
- a second chamber disposed substantially directly beneath the bed floor and adjacent to the second opening, the second chamber being separate from the first chamber and accessible from the first chamber through the second opening, the second chamber being configured to provide a storage location directly beneath the bed floor for substantially an entire spare tire;
- a closure member hingedly associated with the bed floor and including a second support surface for directly supporting cargo, the closure member being moveable between a first position in which the second support surface aligns substantially coplanarly with the first support surface and at least partially covers the first opening, and a second position in which the closure member is at least partially removed from the first opening to provide access to the first chamber through the first opening;
- a securement mechanism moveable between locked and unlocked positions for selectively locking the closure member in the first position; and
- an opening mechanism for moving the securement mechanism between the locked and unlocked positions, the securement mechanism and the opening mechanism both being disposed entirely below the second support surface when the closure member is in the first position.

* * * * *